United States Patent [19]

Shurgan et al.

[11] 3,988,633

[45] Oct. 26, 1976

[54] FLUORESCENT LAMP WITH ENVELOPE GROOVES

[75] Inventors: Joel Shurgan, Washington Township, Bergen County; Donald P. Northrop, Glen Rock, both of N.J.; Gordon D. Coplein, Merrick, L.I., N.Y.

[73] Assignee: Duro-Test Corporation, North Bergen, N.J.

[22] Filed: Jan. 30, 1975

[21] Appl. No.: 545,485

[52] U.S. Cl. .............................. 313/493; 313/204; 313/220
[51] Int. Cl.² .................. H01J 61/33; H01J 61/42
[58] Field of Search .................. 313/493, 220, 204; 65/109; D26/8

[56] References Cited
UNITED STATES PATENTS

| | | | |
|---|---|---|---|
| 3,129,085 | 4/1964 | Olsen et al. | 65/109 |
| D198,268 | 5/1964 | Thorington et al. | D26/8 |
| D218,976 | 10/1970 | Venema | D25/8 |

FOREIGN PATENTS OR APPLICATIONS

| | | | |
|---|---|---|---|
| 826,604 | 2/1960 | United Kingdom | D26/8 |

*Primary Examiner*—Palmer C. Demeo
*Attorney, Agent, or Firm*—Darby & Darby

[57] ABSTRACT

A low pressure discharge lamp, particularly a fluorescent lamp, having a plurality of separate and continuous grooves along its length each of which is formed for 360° around the envelope. The groove configuration maintains a generally arcuate cross-section of varying radius to thereby alter the wall recombination rate of the plasma ions with the phosphor. In the embodiments where the cross-section of the envelope as deformed by the groove is non-circular, the invention also acts to increase the plasma arc stream length thereby changing the electrical and luminous properties of the lamp. A method and apparatus for making the grooves using a plurality of heat sources is also described.

10 Claims, 3 Drawing Figures

FLUORESCENT LAMP WITH ENVELOPE GROOVES

Fluorescent lamps have been made in the past with non-cylindrical envelope geometry, that is, with grooves or depressions formed in the wall of the bulb or envelope. Typical of such lamps are those of the Lemmers U.S. Pat. No. 2,916,645 where a plurality of individual depressions are formed in a periodic manner along the length of the bulb wall and parallel to the bulb longitudinal axis. Another type of fluorescent lamp is disclosed in U.S. Pat. No. 3,129,085, which is assigned to the assignee of the subject application and sold under their registered trademark POWER-TWIST. The lamp of that patent has one or more continuous helicoidal grooves formed along and around the longitudinal axis of the envelope for a substantial portion of its length. Still another lamp is shown in U.S. Pat. No. 3,169,657, which is also assigned to the assignee of this application, in which a plurality of disconnected grooves are also formed in a helical pattern around and along the longitudinal axis of the envelope. In U.S. Pat. No. 3,560,786, assigned to the assignee of this application, grooves of variable depths are formed in a helicoidal pattern.

All of the lamps of the foregoing type have non-circular envelope cross-sections in a plane perpendicular to the longitudinal axis of the lamp where the groove or grooves exist. The advantages of such cross-sections are described in several of the aforesaid patents. For example, they permit a longer effective arc stream length in the same envelope thereby increasing the wattage loading of the lamp, have better recombination of the mercury ions in the plasma with the phosphor on the envelope wall to improve the efficiency, etc.

Lamps of the types described in the aforementioned patents are generally rather difficult to make. In general, special machinery or presses are required. The machinery must be programmed to make the desired groove shapes and, in some cases, is relatively slow. For example, in the helicoidal groove lamps, generally only one heat source, such as a flame from a burner, can be used for forming each groove and the source must be moved along substantially the entire length of the lamp as the lamp is rotated. This takes a relatively long time. In lamps of the type shown in the Lemmers patent, a plurality of heat sources can be used. However, from a practical point of view, even there the heat sources can make only several grooves at a time, and the sources and lamp envelope must be moved longitudinally relative to each other. Of course, a large number of heat sources are used but this complicates the production apparatus. Another alternative is to use a heat press. However, lamps made by such presses are often more subject to weakness due to stresses produced on the envelope wall than lamps made by burners.

The present invention relates to novel fluorescent lamps of different construction from those in which the depressions are formed as one or more helicoids around and generally along the length of the envelope, or parallel to the longitudinal axis, as in the manner of the Lemmers patent. The present invention provides a novel fluorescent lamp wherein a plurality of individual grooves which are spaced from each other are formed for only 360° around the longitudinal axis of the lamp. Each of the grooves is preferably continuous and is not connected to any other groove. The grooves are separated by undeformed sections of the lamp envelope to preserve the structural integrity of the lamp as well as its overall cylindricity. The grooves can be radial to the envelope longitudinal axis or at an angle thereto.

The present invention also relates to a method and apparatus for making the lamps in which a plurality of heat sources are used. Each heat source forms a single groove and a plurality of grooves are formed at the same time since a simple type of relative motion is all that is required between the heat sources and the envelope.

It is therefore an object of the present invention to provide a fluorescent lamp having a number of independent grooves or depressions therein which are formed around the longitudinal axis of the lamp envelope.

A further object is to provide a novel fluorescent lamp having a plurality of separate grooves in the envelope wall which are radial to the envelope longitudinal axis.

Another object is to provide a novel fluorescent lamp having a plurality of separate grooves in the envelope wall which are at an angle to the envelope longitudinal axis.

An additional object is to provide a novel method and apparatus for making a fluorescent lamp having a plurality of separate grooves in the envelope wall which are either radial or at an angle to the envelope longitudinal axis.

Other objects and advantages of the present invention will become more apparent upon reference to the following specification and annexed drawings, in which.

Figure 1:
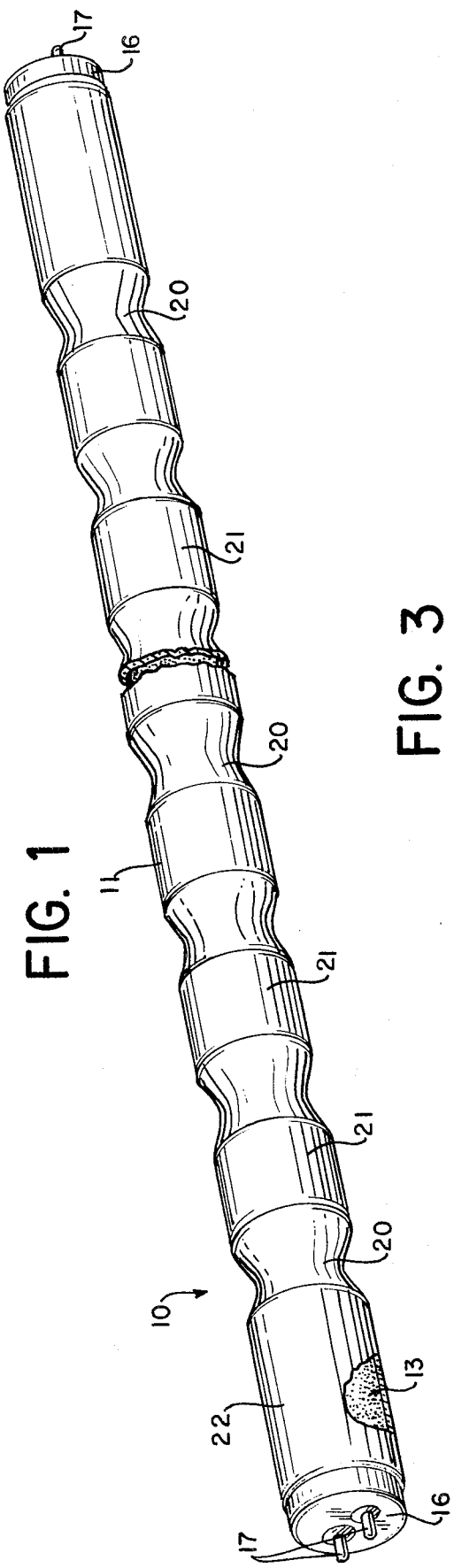
FIG. 1 is a perspective view of a lamp according to a preferred embodiment of the invention.

FIG. 1 shows a fluorescent lamp 10 made in accordance with a preferred embodiment of the invention. The lamp includes the usual envelope 11 of glass which is coated with a phosphor material 13 of any suitable type on the internal wall thereof. The lamp has glass stem seals (not shown) at each end thereof to which are attached an end cap 16 with its corresponding electrical terminals 17. At least one of the glass stems has a tubulation through which the lamp can be exhausted. An electron emissive cathode or filament cathode (not shown) is also mounted on each stem. Electrical connections are made from each cathode to the respective terminals 17 at each end of the lamp. While a pair of terminals 17 is shown, as found in a conventional bi-pin terminal arrangements used in preheat or some rapid start type fluorescent lamp systems, the subject invention is also applicable to fluorescent lamps of the single terminal pin types used in instant start lamp circuits, or with recessed double contact types used in other lamp circuits.

In addition to the internal coating of the phosphor 13, the lamp also contains a fill gas at a low pressure, for example argon in the range of 1.0 to 3.5 mmHg, a mixture of 5 to 30 percent neon and 95 to 70 percent argon, in the range of from 1.0 to 3.5 mmHg, or any other suitable gas mixture. The lamp also contains a quantity of an ionizable metal, for example mercury. Except with respect to the shape of the envelope 11, the fluorescent lamp is of generally conventional construction and utilizes conventional fill gases and ionizable metals.

A plurality of spaced grooves 20 are formed in the envelope wall leaving undeformed sections 21 therebetween. Each of the grooves 20 is separate and independent and extends for 360° around the envelope. The grooves 20 of FIG. 1 preferably have a generally parabolic cross-section in a plane taken through and parallel to the longitudinal axis of the envelope. The center of the groove 20 is deeper and closer to the center of the tube with the groove edges tapering outwardly therefrom. The groove is symmetrical about its center line, the latter essentially being a ring. In FIG. 1, each groove so is shown as being radial, that is the center line of the symmetrical groove lies in a plane which is transverse to the envelope longitudinal axis. As should be apparent, a variable cross-section is present in the envelope over the area where each groove exists. The cross-section is generally circular and it changes its diameter as it is moved along the envelope longitudinal axis and transverse thereto.

Shapes other than parabolic can be utilized for the grooves. For example, a more rectangular shape, hyperbolic, or a parabola which is tilted to one side can be used. The latter two groove shapes would give rise to more non-circular envelope cross-section. In general, for ease of manufacture, each of the grooves 20 of a given lamp is of the same shape and size. Of course, the shape and size (i.e. width and depth) of the individual grooves can be varied. An undeformed section 22 is located between the last grooved section 20 at each end of the envelope and the corresponding end cap. Section 22 preferably has a length approximately two to three diameters of the envelope for practical reasons of manufacturing. However, other lengths can be used. As should be apparent, the total envelope has an overall cylindrical shape and it will roll.

A lamp of the type shown in FIG. 1 having a pleasing esthetic appearance and good utilization of the envelope surface area has been made with the formed (grooved) and undeformed envelope sections of about the same width as the bulb diameter. The radius of the deformed groove was in the order of 80 percent of the radius of the undeformed section. That is, the of a groove was a maximum of about 20 percent of the total envelope radius making a grooved section have a minimum diameter about 60 percent of that of an undeformed section. In this lamp the total width of a groove was approximately equal to the width of an undeformed section between two of the grooves. Other geometries also can be used, that is, different groove widths, depths and spacings, variable spacings between the grooves, etc. Each groove need not be of the same configuration, although it is preferred that they all be the same for ease of manufacture.

In the operation of the lamp of FIG. 1, when voltage is applied across the terminals 17 an arc stream discharge is produced within the envelope. Due to the presence of the grooves, at least a portion of the arc stream tends to travel a generally sinuous path along the length of the envelope where the grooves exist. This increases the arc stream length. In addition, in the grooved sections the arc stream travels through a more restricted opening and is thereby closer to the envelope wall. This improves the recombination rate of the plasma mercury ions with the phosphor.

In a typical operating example of a fluorescent lamp made in accordance with the invention, a 48 inch fluorescent lamp was made with the geometry shown in FIG. 1, with an envelope 1½ inch diameter (48T12). The grooves 20 were made symmetrical, of generally parabolic shape, were one inch in length across the interior spacing, and had a maximum depth of one-quarter inch. The grooves were separated by undeformed sections 21 one inch wide. The end sections 22 were three inches long. The gas fill was 100 percent argon at about 2.2 mmHg.

The following is a table showing the operational characteristics of the foregoing lamp as compared to a standard 48T12 lamp with no grooves having the same gas fill and operating conditions:

|  | Grooved Lamp | Standard Lamp |
| --- | --- | --- |
| Volts | 107.1 | 102 |
| Amperes | 427 | 430 |
| Watts | 40.5 | 40.0 |
| Lumens | 3080 | 3020 |

The above table shows an increased wattage loading for the grooved lamp and a consequent increase in the lumen output of the lamp. This improvement occurs without any overall increase in the physical length of the lamp.

By making the grooves deeper, the wattage loading can be further increased. This will produce a corresponding increase in light output, as is generally associated with lamps of higher wattage loading.

Figure 2:
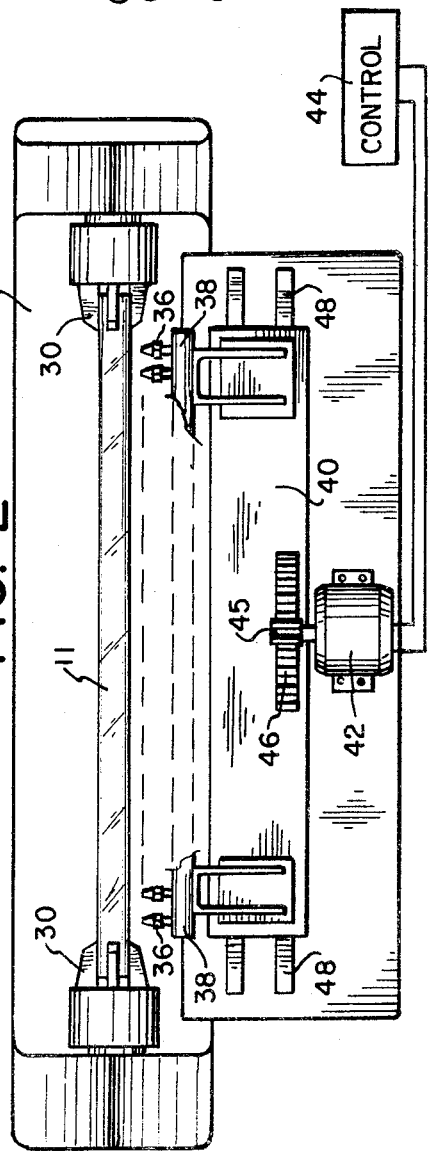
FIG. 2 is a top plan view of apparatus for making the lamps according to the invention.

FIG. 2 shows one type of apparatus for the manufacture of the lamp of FIG. 1. Here, the lamp envelope 11 to be processed is mounted, such as by chucks, between the end plates of a conventional glass lathe 34. The envelope is rotated at a given speed by the lathe. A plurality of heat sources, such as gas burners 36, are mounted on a manifold 38. Burners 36 are spaced apart by the distance desired between the grooves 20. This spacing is made adjustable. The burners can have nozzles which permit shaping of the flames produced to change the shape of the grooves. The burners are mounted on a carriage 40 which can move transverse to, and also preferably longitudinally of, the envelope.

In operation, the fires produced by burners 36 are advanced toward the envelope to the extent needed to produce the desired depth grooves. The envelope is rotated and the fires melt the glass and produce the grooves. In general, only one 360° rotation of the envelope is needed.

While one burner is shown to prduce a respective one of the grooves, it should be understood that the grooves can be produced in sets. For example, the number of burners can be one-half of the number of grooves. After one set of grooves is produced by these burners the envelope is moved longitudinally and the burners produce another set of grooves. The number of burners also can be reduced and more sets of grooves produced sequentially.

Figure 3:
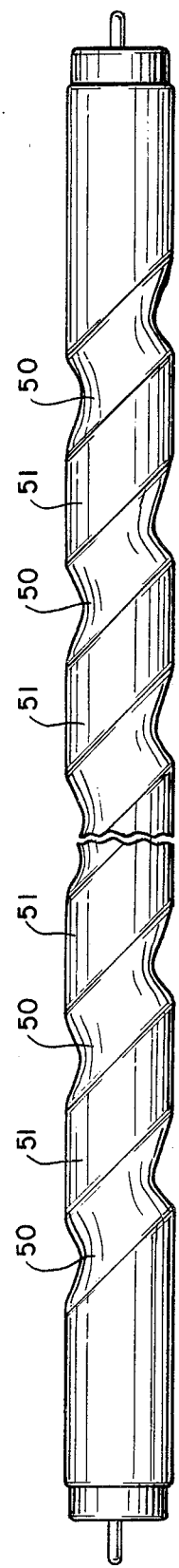
FIG. 3 is a plan view of 8 lamp according to another embodiment of the invention.
Figure 4:
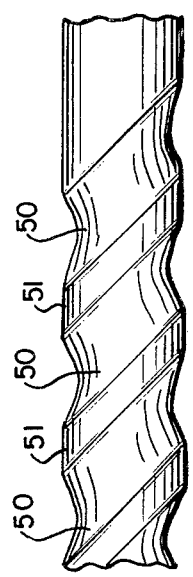
FIG. 4 is a fragmentary plan view of a lamp according to a further embodiment of the invention.

FIGS. 3 and 4 show further embodiments of the lamp. In FIG. 1 the grooved sections 20 are radial, that is, each groove is symmetrical about a center line which is in a plane generally transverse to the longitudinal axis of the envelope. In the lamp of FIGS. 3 and 4 there are a plurality of separate grooves 50 having respective center lines which are each located in a plane which is at an acute angle to the envelope longitudinal axis. As before, each adjacent pair of grooves 30 is separated by an undeformed section 51. By making the grooves in this manner, each groove provides a larger deformed surface area than is formed when the groove is radial, as in FIG. 1. In addition, the envelope cross-section is non-circular everywhere a groove exists. The presence of a larger amount of deformed surface area further increases the arc stream length and the plasma recombination efficiency adjacent the phosphor. The non-circular cross-section also aids in the latter.

In the embodiment of FIG. 3 adjacent grooves 50 do not overlie each other. In the embodiment of FIG. 4, the grooves are moved closer together, reducing the length of the undeformed sections 51, and the grooves overlie one another.

In either of the embodiments of FIGS. 3 or 4 the grooves 50 can be slanted off of the envelope longitudinal axis by any desired angle. In general, an angle of at least 30° between the groove center line and the envelope longitudinal axis is desired. If the angle is made less than this the groove tends to be more parallel to the envelope axis and the envelope is subject to a greater degree of stress. At an angle of 90°, the embodiment of FIG. 1 is achieved. In both cases of FIGS. 3 and 4, the overall outer cylindricity of the envelope is maintained.

The apparatus of FIG. 2 can be used to make the lamps of FIGS. 3 and 4. Here, a programmable motor 42 with a controller 44 is provided. Motor 42 has a pinion gear on its output shaft which meshes with a rack 46 mounted on the burner carriage 40. The latter rides on slides 48. As motor 42 rotates it provides a reciprocating motion to carriage 40 longitudinally of the envelope. This is in addition to the rotating motion of the envelope provided by the lathe.

The reciprocating motion of carriage 40 is timed by the controller 44 so that during one-half of a revolution of the lamp envelope the carriage moves steadily in one direction and at a uniform rate from an origin point to a terminal point. The distance between the origin and terminal point is the distance between a projection of the groove center line on the envelope longitudinal axis. During the next half revolution of the envelope the motor direction is reversed and the carriage is returned at a steady rate to its origin point. By doing this, a slanted groove of uniform shape is produced by each burner for 360° around the envelope. The longitudinal motion of the carriage relative to the speed of rotation of the lamp determines the slant angle of the grooves.

The lamps of FIGS. 3 and 4 differ from those of the type shown in U.S. Pat. No. 3,129,085 in that there are a plurality of independent grooves. Each of the grooves extends for 360° around the envelope and starts and finishes on itself. In U.S. Pat. No. 3,129,085 a groove starts at one point on the lamp and finishes a distance away from the start.

The lamps of the subject invention have several mechanical advantages in addition to the electrical advantages previously discussed. First of all, they have a general overall cylindricity so that they can be rolled, bundled and easily coated with phosphor. In addition, the grooves can be formed in a manner which is relatively simple and with relativity uncomplicated lamp manufacturing machinery. In addition, the envelope can be used at any orientation. That is, the amount of light produced is the same irrespective of the orientation of the lamp in its fixture.

The lamps can be made of relatively thin material, for example 0.030 inch (30 mil) glass and still remain strong. This is due to the overall cylindricity of the envelope and to the fact that the stresses are relatively well equalized throughout the length of the lamp.

Other shaped grooves can be produced merely by varying the timing of the longitudinal motion of the carriage. For example, a chevron shaped groove can be formed by moving the carriage up and back twice during each 360° rotation of the envelope, one complete movement during each 180° of rotation.

What is claimed is:
1. A fluorescent lamp comprising an elongated cylindrical envelope of vitreous material, cathode means at each end of the envelope, a phosphor on the inner wall of said envelope and means within said envelope for producing an arc stream discharge when a voltage is applied across said cathodes, said cylindrical envelope being formed with a plurality of depressed grooves to interact with the arc stream discharge, each of said grooves extending around a major portion of the cylindrical envelope surface and being separate and independent of each other, the areas of the envelope without the grooves defining an overall cylindrical shape for the envelope.

2. A fluorescent lamp as in claim 1 wherein each said groove extends for 360° around the envelope and starts and finishes on itself.

3. A fluorescent lamp as in claim 1 wherein each said groove is uniform in depth and shape throughout its extent.

4. A fluorescent lamp as in claim 1 wherein said grooves extend radially of the longitudinal axis of the envelope.

5. A fluorescent lamp as in claim 1 wherein said grooves lie at an angle with respect to the longitudinal axis of the envelope.

6. A fluorescent lamp as in claim 5 wherein said grooves lie at an angle in the range of between about 30° to about 90° with respect to the longitudinal axis of the envelope.

7. A fluorescent lamp as in claim 5 wherein adjacent grooves are spaced from each other along the length of the envelope and do not overlie each other.

8. A fluorescent lamp as in claim 7 wherein adjacent grooves are each separated by an undeformed section of the envelope.

9. A fluorescent lamp as in claim 5 wherein adjacent grooves are spaced to overlie each other.

10. A fluorescent lamp as in claim 5 wherein each groove is chevron-shaped.

* * * * *